United States Patent

Gutweiler et al.

[11] Patent Number: 5,580,938
[45] Date of Patent: *Dec. 3, 1996

[54] GRAFT POLYVINYL ACETALS HAVING ACETAL GROUPS FROM ETHERIFIED ω-HYDROXY(POLY)ALKOXYALKANALS, PROCESSES FOR THEIR PREPARATION AND THEIR USE

[75] Inventors: Matthias Gutweiler, Taunusstein; Matthias Kroggel, Kelkheim, both of Germany

[73] Assignee: Hoechst Aktiengesellschaft, Germany

[ * ] Notice: The term of this patent shall not extend beyond the expiration date of Pat. No. 5,034,475.

[21] Appl. No.: 781,498

[22] Filed: Oct. 22, 1991

[30] Foreign Application Priority Data

Oct. 24, 1990 [DE] Germany ............ 40 33 775.8

[51] Int. Cl.$^6$ ................................. C08F 283/04
[52] U.S. Cl. .................. 525/455; 525/56; 525/58; 525/61; 525/62; 525/440
[58] Field of Search ........................ 525/56, 58, 61, 525/62, 440, 455

[56] References Cited

U.S. PATENT DOCUMENTS 5,019,624  5/1991  Gutweiler et al. ................. 525/61
5,034,475  7/1991  Kroggel et al. ..................... 525/455

Primary Examiner—Stevan A. Resan
Assistant Examiner—Mary Critharis
Attorney, Agent, or Firm—Bierman and Muserlian

[57] ABSTRACT

Graft polyvinyl acetals having acetal groups from etherified ω-hydroxy(poly)alkoxyalkanals, processes for their preparation and their use Polymeric acetals of polyvinyl alcohols grafted onto polyalkylene oxide graft bases or onto polyurethane graft bases, which contain acetal groups from etherified ω-hydroxy-(poly)alkoxyalkanals of the formula (I), and processes for their preparation by acetalization of corresponding graft polyvinyl alcohols are described.

The polymeric acetals according to the invention are polymers which are plasticized internally and in general obtainable in solid form and which can be processed to films, shaped articles or coatings by thermoplastic methods without external plasticizers. Mixed acetals with other aldehydes can also be prepared and allow wide variants in the properties, inter alia the solubilities in water or in organic solvents. The polymeric acetals according to the invention can be processed or used in bulk, for example from the melt, or as organic or aqueous solutions or as aqueous dispersions.

11 Claims, No Drawings

GRAFT POLYVINYL ACETALS HAVING ACETAL GROUPS FROM ETHERIFIED ω-HYDROXY(POLY)ALKOXYALKANALS, PROCESSES FOR THEIR PREPARATION AND THEIR USE

DESCRIPTION

Graft polyvinyl acetals having acetal groups from etherified ω-hydroxy(poly)alkoxyalkanals, processes for their preparation and their use The invention relates to graft polyvinyl acetals on polyalkoxy graft bases or on polyurethane graft bases, which contain acetal groups from etherified ω-hydroxy(poly)alkoxyalkanals of the formula (I) and can be prepared by acetalization of graft polyvinyl alcohols with etherified ω-hydroxy(poly)alkoxyalkanals of the formula (I) and if appropriate other aldehydes by known methods, and to the use of the graft polyvinyl acetals as binders in solvent-containing or in aqueous adhesives and varnishes, as coating agents, as films and shaped articles which can be produced by thermoplastic methods without addition of plasticizer, as dispersing agents in aqueous systems and as textile auxiliaries. The invention also relates to, inter alia, all the subject matter, product and process features and compositions disclosed and claimed in the patent claims.

Polyvinyl acetals, in particular polyvinyl butyrals, and their preparation from polyvinyl alcohols and aldehydes are known. Polyvinyl butyrals are known to have many industrial uses, for example as binders for the preparation of primers and varnishes, as adhesives and coating agents and as films for the production of laminated glasses.

Because of the high melting point of polyvinyl butyrals and their low flowability, even at high temperatures, it is known that these can be processed by thermoplastic methods only after addition of external plasticizers, for example phthalic acid esters of alcohols having 6 to 10 carbon atoms, triethylene glycol di-n-heptanoate, tri-(2-printing inks, ceramic green films, sizing agents, fiber binders, paper, photographic printing plates and photoresist material, and as shaped articles and transparent intermediate films for laminated glasses. various materials, such as, for example, to glass or various metals.

The present invention was thus based on the object of providing internally plasticized graft polyvinyl acetals having high contents of free vinyl alcohol units which can be processed by thermoplastic methods without addition of external plasticizers. Another object was to provide graft polyvinyl acetals which can fulfil a broad field of use, as well as having good thermoplastic processability, in that they are soluble, for example, in cold water or in organic solvents and furthermore can display a high adhesion affinity on metals and glass.

This aim can be achieved according to the present invention with graft polyvinyl acetals in which at least some of the acetal groups are derived from aldehydes of the formula (I)

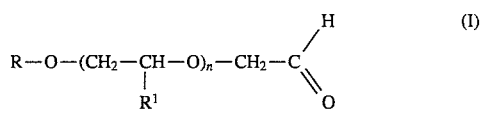  (I)

in which n is an integer from 1 to 50, preferably 1 to 15, in particular 1 to 3, particularly preferably 2, R is $(C_1-C_{20})$-alkyl or $(C_6-C_{20})$-cycloalkyl, -aryl, -aralkyl or -alkaryl, preferably benzyl, phenyl or phenyl which is substituted by one to three $(C_1-C_{12})$-alkyl radicals, or preferably $(C_1-C_{12})$-alkyl, in particular $(C_1-C_4)$-alkyl, particularly preferably methyl, and $R^1$ is H, —$CH_3$ or —$C_2H_5$, preferably H.

The aldehydes of the formula (I) are terminally etherified ω-hydroxypolyalkoxyalkanals or terminally etherified ω-hydroxyoligoalkoxyalkanals or terminally etherified ω-hydroxyalkoxyalkanals. For simplification, the compounds of the formula (I) are also called ω-hydroxy(poly)alkoxyalkanals in the description and in the patent claims. ω-Hydroxyoligoalkoxyalkanals where n is 2 to 15 are particularly preferred.

Aldehydes of the formula (I) are accessible from addition products of alkylene oxides on hydroxy compounds of the formula R—OH, in which R has the meaning as in formula (I), by conversion of the terminal OH group into a

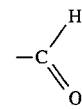

group by known processes, for example by catalytic oxydehydrogenation according to DE-OS 3,701,304.

The graft polyvinyl alcohols which can be employed according to the invention for the acetalization for the preparation of graft polyvinyl acetals based on polyalkylene glycol contain, as the graft base, in particular polyalkylene glycols having molecular weights [M] of more than 6000 g/mol, those having molecular weights of more than 15000 g/mol being particularly preferred. The molecular weight of polyalkylene glycols is in general not critical and can preferably be in the range from 600 to 200,000 g/mol. Preferred polyalkylene glycols are, for example, polyethylene oxides, polypropylene oxides, polybutylene oxides, copolymers of ethylene oxide, propylene oxide and butylene oxide, preferably block copolymers thereof, polyethylene oxides being particularly preferred.

The graft polyvinyl alcohols which can be employed according to the invention for the acetalization for the preparation of graft polyvinyl acetals based on polyurethane contain, as the graft base, in particular polyurethanes having at least 2 urethane groups per molecule, the number of urethane groups contained in the polyurethane not being subject to any particular upper limit, although polyurethanes having 10 to 100 urethane groups in the molecule are preferred.

The invention therefore relates to polymeric acetals of polyvinyl alcohols grafted onto a polyalkylene oxide graft base or a polyurethane graft base, the polyurethane graft base containing at least 2 urethane groups in the molecule and units of diisocyanates and if appropriate small amounts of monofunctional isocyanates as well as units of diols, preferably of alkylene glycols and/or polyalkylene glycols of molecular weight 62 to 10000 g/mol, and if appropriate small amounts of monohydroxy compounds, and polymer radicals containing acetalized vinyl alcohol units being grafted onto the polyalkylene oxide graft base or onto the polyurethane graft base, wherein the polymeric acetals which have been obtained by acetalization of corresponding graft polyvinyl alcohols contain acetal groups which are derived from etherified ω-hydroxy(poly)alkoxyalkanals of the formula I

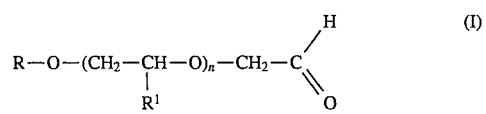  (I)

in which n is an integer from 1 to 50, preferably 1 to 15, in particular 1 to 3, particularly preferably 2, R is $(C_1-C_{20})$ -alkyl or $(C_6-C_{20})$ -cycloalkyl, -aryl, -aralkyl or -alkaryl, preferably benzyl, phenyl or phenyl which is substituted by one to three $(C_1-C_{12})$-alkyl radicals, or preferably $(C_1-C_{14})$ -alkyl, in particular $(C_1-C_4)$ -alkyl, particularly preferably methyl, and $R^1$ is H, —$CH_3$ or —$C_2H_5$, preferably H.

The polyurethanes which can be employed as the graft base can be prepared by the customary processes of polyurethane synthesis. They are built up from diol and diisocyanate components and are preferably synthesized from diols and diisocyanates using catalysts, such as, for example, tertiary amines or organotin compounds, at temperatures between 60° and 120° C., preferably between 70° and 100° C.

All the diol components which can be used in polyurethane synthesis can in principle be employed. Cycloaliphatic diols, such as, for example, cyclohexanediols, and aliphatic diols having preferably 2 to 12 carbon atoms are preferred. Diol components which are furthermore preferred are polyalkylene glycols, such as, for example, polypropylene oxides, polybutylene oxides and copolymers of ethylene oxide, propylene oxide and butylene oxide, preferably block copolymers thereof, polyethylene oxides being particularly preferred. Polyethylene glycols having molecular weights of between 200 and 10000 g/mol are preferably used, polyethylene glycols having molecular weights of between 400 and 1500 g/mol being particularly preferred. If appropriate, the polyalkylene glycols are employed in combination with chain lengthening agents. Preferred chain lengthening agents are, for example, low molecular weight aliphatic diols, above all those having 2 to 10 carbon atoms, such as, for example, butanediols, propanediols, ethylene glycol, diethylene glycol and/or triethylene glycol. Diamines and/or amino-alcohols with primary and/or secondary amino groups can furthermore also be employed as chain lengthening agents, these compounds preferably containing 2 to 10 carbon atoms. Dithiols and hydroxymercaptans having 2 to 10 carbon atoms are also suitable chain lengthening agents.

If chain lengthening agents are employed in polyurethane synthesis, the molar ratio of polyalkylene glycols to the chain lengthening agents is preferably between 1:0.099 and 1:0.71.

Suitable isocyanate components are all the aromatic, aliphatic and cycloaliphatic diisocyanates and polyisocyanates such as are usually employed for synthesis of polyurethanes. Diisocyanates, such as, for example, naphthylene 1,5-diisocyanate, diphenylmethane 4,4'-diisocyanate, dibenzyl 4,4'-diisocyanate, phenylene 1,3-diisocyanate, phenylene 1,4-diisocyanate, toluylene diisocyanate and m- and p-diisocyanatoxylene, and others, are particularly preferred.

It is furthermore preferable to employ aliphatic and cycloaliphatic diisocyanates having 2 to 12 carbon atoms in the aliphatic radical, such as ethylene diisocyanate, propylene diisocyanate, butylene diisocyanate, 2,2,4-trimethylhexamethylene diisocyanate, 1,4-diisocyanatocyclohexane, 4,4'-methylenebis (cyclohexyl diisocyanate), 1-methyl-2,4-cyclohexyl diisocyanate, 1-methyl-2,6-cyclohexyl diisocyanate, 1,3-bis(isocyanatomethyl)cyclohexane, 1,6-hexamethylene diisocyanate and others. The use of isophorone diisocyanate is particularly preferred.

The molar ratios of diol to diisocyanate components are preferably between 1:0.99 and 1:0.5, in particular between 1:0.98 and 1:0.7. The average molecular weights of the polyurethanes are preferably between 200 and 100,000 g/mol, in particular between 1000 and 60000 g/mol, particularly preferably between 3000 and 40000 g/mol.

Polyether-urethane graft bases are particularly preferred.

Carboxylic acid vinyl esters having 3 to 20 carbon atoms, preferably 4 to 14 carbon atoms, are preferably employed for grafting onto the polyalkylene glycol graft bases or in an analogous manner onto the polyurethane graft bases. Vinyl acetate and/or vinyl propionate are particularly preferred, especially vinyl acetate. Mixtures of vinyl acetate and/or vinyl propionate and/or vinyl propionate in combination with vinyl versatate are furthermore preferred.

Grafting using various carboxylic acid vinyl esters, preferably to form block copolymers, if appropriate in combination with other ethylenically unsaturated monomers which differ from the carboxylic acid vinyl esters, may also be advantageous. Suitable other ethylenically unsaturated monomers here are all the ethylenically unsaturated monomers which can be polymerized and copolymerized by free radicals, preferably acrylic and methacrylic acid derivatives, such as, for example, acrylic and methacrylic acid esters, acryl- and methacrylamides, α-olefins having 2 to 20 carbon atoms, styrene and styrene derivatives, acrylonitrile and acrylonitrile derivatives, vinylpyrrolidone and vinylpyrrolidone derivatives and vinyl chloride. Ethylenically unsaturated acids, preferably carboxylic acids, and derivatives thereof, such as, for example, maleic acid, crotonic acid, itaconic acid, acrylic acid and methacrylic acid, can furthermore also be grafted. Vinyl acetate and/or vinyl propionate are particularly preferred.

Grafting of the monomers onto the graft bases is carried out using initiators which start free radical chains, for which, preferably, all the agents which form free radicals and are soluble in the monomers, the monomer mixture or the monomer solution can be suitable. Organic percompounds, such as, for example, peroxides and percarbonates, and organic azo compounds have proved to be particularly suitable for the grafting. The grafting reaction can in principle be carried out in the presence of small amounts of solvent, such as, for example, methanol or ethanol. However, grafting is preferably carried out in bulk without a solvent. Mixtures of polyalkylene glycol graft bases and polyurethane graft bases can also be employed for the grafting.

The graft polymers obtained can be converted by hydrolysis or transesterification into partially or completely hydrolyzed products, which are also called graft polyvinyl alcohols (graft PVAL) below and are used as starting graft polyvinyl alcohols for the acetalization reactions, the degree of hydrolysis preferably being at least 10 mol %, in particular 30 to 100 mol %, particularly preferably 45 to 99 mol %, based on the number of moles of hydrolyzable monomer units in the graft polymer.

The content of grafted-on components on the particular graft base in the graft polymers or hydrolysis products thereof is preferably 10 to 95% by weight, in particular 20 to 90% by weight, particularly preferably 25 to 80% by weight, based on the graft polymer or hydrolysis product thereof.

The preparation of graft polymers with polyurethane graft bases is known from DE-OS 3,732,089.

In addition to acetal groups which are derived from aldehydes of the formula (I), the graft polyvinyl acetals obtainable according to the invention from the starting graft polyvinyl alcohols can also contain other acetal groups which are derived from aliphatic, cycloaliphatic, araliphatic or aromatic aldehydes, preferably those having 1 to 20 carbon atoms, which are optionally substituted by OH groups or halogen atoms, preferably F or Cl atoms. Aldehydes which are preferably employed are, for example, formaldehyde, acetaldehyde, propionaldehyde, butyraldehyde, isononanaldehyde and benzaldehyde, in particular butyraldehyde. If appropriate, derivatives of these aldehydes, such as, for example, aldehydes substituted by OH groups or halogen atoms, are also used for the acetalization. The solubility properties of the acetals according to the invention can be influenced considerably, for example, by also using such aldehydes or aldehyde mixtures which differ from the formula (I) aldehydes.

Overall, the acetalization of the graft polyvinyl alcohol should preferably affect 1 to 85 mol %, in particular 30 to 80 mol %, particularly preferably 45 to 75 mol %, of the vinyl alcohol units originally present in the starting graft PVAL (=100 mol %). The acetalization with formula (I) aldehydes in this case should preferably affect at least 1 mol %, particularly preferably up to 10 mol %, in particular up to 20 mol %, of the vinyl alcohol units originally present.

The properties of the graft polyvinyl acetals, in particular the solubilities and the glass transition temperature, are influenced considerably by the aldehyde used or the aldehyde mixture used and the degree of acetalization. Thus, for example, the introduction of another ethylene oxide group into ω-hydroxyethoxyalkanals or ω-hydroxyoligoethoxyalkanals of the formula (I) which are comparably etherified terminally and have the same degree of acetalization leads to significantly greater internal plasticizing of the polymeric acetal. This manifests itself measurably in a drop in the glass transition temperature of the graft polyvinyl acetal. A greater internal plasticizing, with the same aldehyde of the formula (I), can likewise be achieved, for example, by a higher degree of acetalization. The solubility of the graft polyvinyl acetals can also be influenced, inter alia, by the nature and length of the radical R in formula (I) of the aldehyde employed for the acetalization and by the degree of acetalization. The water-solubility of graft polyvinyl acetals according to the invention can furthermore be influenced by mixed acetalization with other aliphatic or aromatic aldehydes, in particular with butyraldehyde. Acetalizations with aldehydes of the formula (I) where R=methyl without the additional co-use of other aldehydes lead to water-soluble graft polyvinyl acetals. Mixed acetalizations with aldehydes of the formula (I) in combination with other aliphatic aldehydes, such as, for example, butyraldehyde, can lead to water-soluble or water-dispersible or to water-insoluble graft polyvinyl acetals, depending on the ratio of the aldehydes employed with respect to one another and according to the degree of acetalization.

The graft polyvinyl acetals according to the invention can be prepared from graft polyvinyl alcohols and aldehydes, in accordance with the desired stoichiometry, by known methods in an aqueous, aqueous-organic or organic medium, preferably in an aqueous medium, in the presence of acid catalysts, such as, for example, hydrochloric acid, sulfuric acid, phosphoric acid or p-toluenesulfonic acid. In this procedure, the catalyst can be added gradually to an aqueous solution of graft polyvinyl alcohol containing the aldehyde, or the aldehyde can be added to an aqueous solution of graft polyvinyl alcohol containing the catalyst, or the reaction can be carried out in a one-pot process.

It may have an advantageous effect on the course of the acetalization in the case of acetalization in aqueous media if emulsifiers are also used. Preferred possible emulsifiers here are anionic emulsifiers, in particular from the group comprising ($C_8$–$C_{20}$)-alkanesulfonic acids, fluorinated fatty acids and fluorinated long-chain sulfonic acids, long-chain alkylsulfosuccinate esters and mixtures of these emulsifiers.

All the known graft polyvinyl alcohols having a polyalkylene graft base or a polyurethane graft base can in principle be employed for the acetalization (cf. DE-OS 3,732,089). Mixtures of these graft polyvinyl alcohols can also be employed. If appropriate, additions of non-grafted polyvinyl alcohols may also be advantageous in some cases.

To prepare water-insoluble graft polyvinyl acetals according to the invention in an aqueous medium, preferably 1 to 50% strength by weight, in particular 5 to 20% strength by weight, aqueous solutions of graft polyvinyl alcohol are first prepared, preferably under the influence of heat, the acid catalyst is added, the solutions are then cooled to temperatures <15° C. and the acetalization reaction is carried out by metering in the aldehyde in accordance with the desired stoichiometry, preferably in the course of 5 to 300 minutes with vigorous stirring, and if appropriate under an inert gas atmosphere. When the metering in has ended, the reaction mixture is stirred for a further 1 to 3 hours under acetalization conditions and is then neutralized if appropriate, and the graft polyvinyl acetal is isolated, washed and dried.

If appropriate, the acetalization reaction can also be carried out as a one-pot process by simultaneously metering the reactants, reactant solutions and catalysts, cooled to <15° C. if appropriate, into a stirred reactor, if appropriate under an inert gas atmosphere.

The amount of aldehyde to be added depends on the degree of acetalization sought and the stoichiometric requirement which can be calculated therefrom, as well as on the conversion which can be achieved.

In a particularly preferred process variant for the preparation of water-insoluble polymeric acetals, the acetalization is started in the aqueous starting graft polyvinyl alcohol/acid catalyst solution at temperatures of 5° to 10° C., after which the water-insoluble graft polyvinyl acetal formed usually starts to separate out at once in powder form. To bring the reaction to completion, the reaction mixture is warmed slowly to room temperature, until the metering in has ended, and when the metering in has ended, an after-reaction lasting about 1 to 3 hours at a higher temperature, for example at 25° to 70° C., with stirring, preferably follows.

If appropriate, the reaction is advantageously carried out with addition of an emulsifier, the emulsifier preferably being a surface-active sulfonic acid which can act simultaneously as an emulsifier and as an acid catalyst, which, especially in the case of water-insoluble graft polyvinyl acetals, can lead to an increase in their reactivity during the acetalization, inter alia as a result of an improvement in their wettability, and can therefore be particularly advantageous. The emulsifier can be added either to the starting solution or to the reaction mixture during the course of the reaction and/or during the after-reaction. The amount of acid catalyst to be used depends, inter alia, on the degree of acetalization sought and can preferably be up to 1.1 equivalents, based on the molar content of vinyl alcohol units.

The resulting water-insoluble graft polyvinyl acetal, which preferably separates out of the aqueous reaction solution in powder form, is separated off from the liquid phase, washed with weakly alkaline water (pH 9–12) and dried.

The water-soluble graft polyvinyl acetals according to the invention can likewise be prepared in an aqueous medium by the preferred process described above. However, the resulting aqueous graft polyvinyl acetal solutions in general display a temperature-dependent demixing of phases. The phase transition temperature (turbidity temperature or turbidity point in °C.) is influenced here by the degree of acetalization and the composition of the aqueous phase. This phase demixing temperature also specifies the maximum acetalization temperature, which should preferably not be exceeded. The polymeric acetal can be isolated from the aqueous solution, after prior neutralization of the solution, by addition of suitable precipitating agents. Preferred suitable precipitating agents are, for example, various water-soluble inorganic salts, such as, for example, sodium chloride, potassium chloride, sodium sulfate, magnesium chloride and calcium chloride. Water-miscible solvents, for example water-soluble alcohols, preferably ethanol and/or methanol, and other water-miscible organic solvents, preferably, for example, tetrahydrofuran and/or dioxane, can furthermore be used for the precipitation. Alternatively, the polymeric acetal can be isolated by freeze drying after prior dialysis of its aqueous solution. Water-soluble graft polyvinyl acetals according to the invention are particularly preferably isolated, after prior neutralization of the aqueous solution, by simple heating of the solution to a temperature above the phase demixing temperature. This procedure leads to complete demixing of the phases. The resulting graft polyvinyl acetal is filtered off hot, washed with hot water and then dried.

All the graft polyvinyl acetals according to the invention can in principle also be prepared in organic solvents. The preparation can be carried out as a two- or multi-phase reaction with the starting graft polyvinyl alcohols which are not soluble in organic solvents. A one-phase reaction can often also be achieved by addition of water to water-soluble or water-dilutable solvents.

Suitable solvents here are, for example, xylenes, toluene, chloroform and methylene chloride, water-miscible solvents being particularly suitable, and water-soluble alcohols, in particular ethanol and/or methanol, tetrahydrofuran, dioxane, acetone and others being preferred.

To prepare graft polyvinyl acetals according to the invention in organic solvents, the acid catalyst, the aldehyde and the graft PVAL are made into a slurry or suspended or dispersed or if appropriate dissolved in the organic solvent and the mixture is heated under reflux. If appropriate, the aldehyde can also be metered in during the course of the reaction. In this procedure, the starting graft polyvinyl alcohols which are insoluble in the organic solvent dissolve as the acetalization progresses. When the acetalization reaction has ended, the reaction product can be precipitated by addition of non-polar solvents, such as, for example, pentane, hexane, heptane and others, to the reaction solution or by pouring the reaction solution into ice-cold water or into an ice-cold water/ethanol or water/methanol mixture, filtered off from the liquid phase by suction, washed with weakly alkaline water (pH 9–12) and dried. Alternatively, the product can also be isolated by distilling off the solvent, after neutralization and if appropriate elimination of the acid catalyst.

If appropriate, the graft polyvinyl acetals according to the invention can be crosslinked by various methods. Crosslinking can thus be achieved, for example, by using reactive polyfunctional compounds, such as, for example, isocyanates or acid chlorides, or also by crosslinkings initiated by free radicals, such as, for example, by photochemical or thermal initiation in the presence of agents which form free radicals and monomers which can be polymerized by free radicals.

On the basis of these properties which lead to crosslinkings, the graft polyvinyl acetals according to the invention are also suitable for use as binders, for example in solvent-based varnish formulations in the case of water-insoluble graft polyvinyl acetals or in water-based varnish formulations in the case of water-soluble or water-dispersible graft polyvinyl acetals.

Dispersions having a solids content of >40% by weight can be prepared, for example, using water-dispersible graft polyvinyl acetals on a polyurethane graft base. These dispersions can be particularly advantageously employed in aqueous varnish formulations.

On the basis of the good adhesive and adhesion properties of graft polyvinyl acetals according to the invention on various materials, preferably on metals and glass, the polymers can advantageously be used as coating compositions, it being possible for such coatings to be applied from graft polymer solutions, from dispersions or as graft polymer melts.

In contrast, for example, commercially available polyvinyl butyrals in general cannot be used from the melt without addition of organic plasticizers.

Because of their surprisingly good adhesion properties and their advantageous non-corrosive behaviour, the graft polyvinyl acetals according to the invention are particularly interesting coating compositions for metals, preferably for iron and steel. Graft polyvinyl acetals with polyurethane graft bases are preferred here because of their particularly advantageous non-corrosive behaviour on metals.

The invention therefore furthermore relates to the use of the graft polyvinyl acetals according to the invention, inter alia in all the fields of use mentioned in the present description, in particular as binders for the preparation of varnishes and coating compositions, as transparent intermediate films in the production of laminated glass, as a dispersing agent and protective colloid, as a sizing agent and as a lubricating agent in textile finishing.

The graft polyvinyl acetals according to the invention can also advantageously be employed in numerous fields of use in which known polyvinyl acetals which are in general soluble only in organic solvents are usually used, preferably, for example, as binders for pigments, for the preparation of printing inks, hot-melt adhesives and solvent-containing or solvent-free adhesives and as binders for ceramic powder, for example for ceramic green films in the production of high-performance ceramic electronic components. They are also suitable as binders and/or a coating constituent for inorganic and/or organic fibers, threads, fiber non-wovens, textile structures, cellulose materials and paper. They are moreover suitable as binders for photographic print plates and photoresist material.

The graft polyvinyl acetals according to the invention can be mixed with customary additives, such as, for example, pigments, dyestuffs, plasticizers, solvents, adhesion regulators and stabilizers, depending on their use. As already mentioned above, it is in principle not necessary also to use plasticizers during thermoplastic shaping of graft polyvinyl acetals according to the invention, although they can be advantageous in some cases. In the latter case, however, the amounts of plasticizers used for the graft polyvinyl acetals according to the invention are considerably lower than those for comparable known non-grafted polyvinyl acetals, in particular polyvinyl butyrals. Mixtures or blends of graft polyvinyl acetals according to the invention with the customary polyvinyl acetals based on non-grafted polyvinyl alcohols, preferably with customary polyvinyl butyrals, are possible and may be advantageous in some cases.

The phenolic compounds used for the known polyvinyl butyrals, such as 2,6-di-tert.-butyl-4-methylphenol, for example Jonol (manufacturer: Shell), and phosphites, such as tris-nonylphenyl phosphite, can be used as stabilizers.

The additives mentioned and if appropriate other additives can in many cases be added either before or during or after the preparation of the graft polyvinyl acetals according to the invention.

The invention is illustrated in more detail by the following examples.

The limiting viscosity number [η] ("eta"=intrinsic viscosity) is preferably determined in an Ostwald viscometer in all the examples. The concentrations of the solutions measured here are so low that no "Hagenbach correction" has to be made.

The molecular weights [M] are weight-average molecular weights calculated from the stoichiometry of the components.

The degrees of hydrolysis are determined by methods which are known from the literature, the polymers being hydrolyzed completely with alkali metal hydroxide solution.

EXAMPLE 1

Preparation of a polyurethane graft base 3000 g of polyethylene glycol (M=600), 193.1 g of 1,4-butanediol and 1.5 ml of N,N-dimethylpiperazine are initially introduced into a reaction vessel with a stirrer, under a nitrogen atmosphere, and are heated to a temperature of 73° C. 1428.2 g of isophorone diisocyanate are then added dropwise in the course of 2.5 hours such that the temperature of the reaction mixture does not exceed 100° C. To bring the reaction to completion, the reaction mixture is stirred at 80° C. for a further 2 hours.

The completeness of the conversion and thus the end of the reaction is determined by analysis of the diisocyanate consumption by customary methods (IR spectroscopy, titration).

The resulting polymer has a calculated molecular weight M of 26550 g/mol and is present as a highly viscous liquid at 20° C.

The limiting viscosity number [η] of the polymer in methanolic solution is 16.5 ml/g, determined in an Ostwald viscometer at 25° C.

EXAMPLE 2

Preparation of a graft polyvinyl acetate (graft PVAc) on a polyurethane graft base 1500 g of the polyurethane graft base from Example 1 are initially introduced into a stirred vessel at a temperature of 75° C. under a nitrogen atmosphere. A solution of 26.1 g of 75% strength by weight dibenzoyl peroxide in 3480 g of vinyl acetate is then metered in for a period of 5 hours at such a rate that the temperature of the reaction mixture does not exceed 90° C. During this addition, it is furthermore to be ensured that the monomeric vinyl acetate to be grafted on, including the catalyst dissolved therein, is metered into the polyurethane graft base so slowly that there is virtually no formation of a homopolymer which has not been grafted on. When the addition of the monomer initiator mixture mentioned has ended, an after-reaction phase of 45 minutes at 80° C., with stirring, follows. When the after-reaction has ended, any excess residual monomer is removed by azeotropic distillation with methanol, if appropriate, and the resulting graft polyvinyl acetate is obtained.

Yield: 4886 g of polymer (=97.3% of theory, based on the vinyl acetate employed)

M (calculated): 86485 g/mol

The graft polymer is present in solid, resinous form at 20° C.

Composition of the resulting graft polyvinyl acetate (calculated):

2.257 g of vinyl acetate units per g of polyurethane graft base

The limiting viscosity number [η] of the polymer in tetrahydrofuran (THF) is 25.9 ml/g, measured in an Ostwald viscometer at 25° C.

EXAMPLE 3

Preparation of a graft polyvinyl alcohol (graft PVAL) on a polyurethane graft base 8598 g of a 50% strength by weight methanolic solution of the graft PVAc from Example 2 are mixed with 266.2 g of 10% strength by weight methanolic sodium hydroxide solution in a stirred vessel at room temperature, with stirring. After about 16 minutes, the reaction mixture solidifies to a gel. After 2 hours, this gel is granulated in a mill with mechanical division and the resulting gel granules are slurried in methanol, neutralized with acetic acid, filtered off with suction, washed several times with methanol and dried in vacuo at temperatures of 40° to 50° C. The resulting graft PVAL is obtained in granule form and has the following characteristic features:

Degree of hydrolysis: 98.5 mol %

M (calculated) 57660 g/mol

The limiting viscosity number [η] of the polymer in water is 17.3 ml/g, measured in an Ostwald viscometer at 25° C.

The Höppler viscosity of the 4% strength by weight aqueous polymer solution at 20° C. is 2.64 mPa.s.

EXAMPLE 4

Preparation of a graft polyvinyl acetal from a graft polyvinyl alcohol

A 20% strength by weight aqueous solution of the graft PVAL from Example 3 with a polymer content of 140 g is prepared in a reaction vessel with a stirrer, under a nitrogen atmosphere and by heating. This solution is mixed with 110 ml of 20% strength by weight aqueous hydrochloric acid and 0.14 g of Ionol (commercially available phenolic antioxidant from Shell), and the reaction mixture is subsequently stirred at 48° C. for 5 hours. A highly viscous solution forms. This is neutralized by addition of aqueous KOH solution at room temperature and is brought to pH 7.5, the KCl formed is removed by dialysis against demineralized water and the resulting graft polyvinyl acetal is obtained in powder to granule form by freeze drying. The content of vinyl alcohol units in the graft polyvinyl acetal is 10.6% by weight, based on the graft polyvinyl acetal, and the alkali titer of the product is 28 ml of N/100 HCl per 100 g of polymer.

The resulting graft polyvinyl-3,6-dioxaheptyral is soluble both in water and, for example, in aqueous 1:1 mixtures with water-soluble organic solvents, preferably alcohols, such as, for example, methanol, ethanol or isopropanol, or ketones, such as, for example, acetone.

The glass transition temperature $T_G$ of the resulting graft polyvinyl acetal is 15° C. In contrast, the $T_G$ of a customary polyvinyl butyral from non-grafted polyvinyl alcohol of comparable molecular weight and comparable degree of acetalization is 75° C.

The resulting graft polyvinyl 3,6-dioxaheptyral can be processed by thermoplastic methods at 165° C. under a pressure of 80 bar without addition of plasticizers to give water-soluble pressed films which have very good adhesion properties, for example on glass and on metals.

EXAMPLE 5

Example 4 is repeated, with the modification that the end product is isolated not by freeze drying of the dialyzed solution but by dropwise addition of the completely reacted and neutralized reaction solution into ice-cold tetrahydrofuran (THF) of 0° C., the graft polyvinyl 3,6-dioxaheptyral precipitating as a powder and being filtered off with suction, washed with cold THF and dried in vacuo.

The properties of the resulting polymer are largely identical to those of the polymer obtained from Example 4.

EXAMPLE 6

Example 5 is repeated, with the modification that instead of 83.7 g of 3,6-dioxaheptanal, only 22.5 g of 3,6-dioxaheptanal are added dropwise and the mixture is then stirred at 48° C. for 3 hours. After the reaction mixture has been cooled to 7° C., 31.5 g of butyraldehyde are added dropwise in the course of 30 minutes, the acetal separating out as a white precipitate, which is filtered off with suction, washed until neutral and dried in vacuo.

The resulting graft polyvinyl mixed acetal contains 15.7% by weight of vinyl alcohol units, based on the graft polyvinyl mixed acetal, and has a $T_G$ of 39° C. It is readily soluble in ethanol and can advantageously be used, for example, as a non-corrosive coating composition for metals. It can furthermore be shaped by thermoplastic methods, without addition of organic plasticizers.

EXAMPLE 7

Example 6 is repeated, with the modification that 60 g of 3,6-dioxaheptanal and 9 g of butyraldehyde are employed instead of the amounts of substance stated in Example 6. The difference in the resulting mixed acetal in comparison with the mixed acetal from Example 6 is that the polymer obtained according to Example 7 remains essentially dissolved in the aqueous solution during its preparation and is finally obtained in the form of a finely divided aqueous dispersion having an average particle diameter of 20 nm. The $T_G$ of the resulting polymeric mixed acetal is 22° C. and its content of vinyl alcohol units is 15.7% by weight, based on the graft polyvinyl mixed acetal. The dispersion is particularly suitable for the production of films and for coating diverse materials, in particular for non-corrosive coatings on metal. These can optionally be crosslinked by also using foreign crosslinking agents. The resulting mixed acetal coatings and films are redispersible in water. They are also soluble, for example, in lower $(C_1-C_4)$-alcohols and in acetone. In the anhydrous state, the mixed acetal can be shaped by thermoplastic methods without addition of organic plasticizers.

We claim:

1. A polymeric acetal of a polyvinyl alcohol grafted onto a polyalkylene oxide graft base or a polyurethane graft base, the polyurethane graft base containing at least 2 urethane groups in the molecule and units of diisocyanates and optionally small amounts of monofunctional isocyanates as well as units of diols and optionally small amounts of monohydroxy compounds, and polymer radicals containing acetalized vinyl alcohol units being grafted onto the polyalkylene oxide graft base or onto the polyurethane graft base, wherein the polymeric acetal which has been obtained by acetalization of the corresponding graft polyvinyl alcohol contains acetal groups which are derived from etherified ω-hydroxy(poly)alkoxyalkanals of the formula I

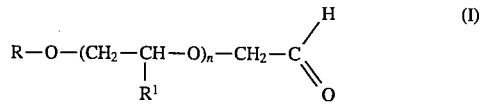

in which n is an integer from 1 to 50,

R is $(C_1-C_{20})$-alkyl or $(C_6-C_{20})$-cycloalkyl, -aryl, -aralkyl or -alkaryl, and $R^1$ is H, —$CH_3$ or —$C_2H_5$.

2. A polymeric acetal as claimed in claim 1, in which at least 1 mol % of the vinyl alcohol units present in the starting graft polyvinyl alcohol are acetalized with aldehydes of the formula (I).

3. A polymeric acetal as claimed in claim 1, which also contains other acetal groups, in addition to the acetal groups derived from aldehydes of the formula (I).

4. A polymeric acetal as claimed in claim 1, which contains acetal groups from aliphatic $(C_1-C_{20})$-aldehydes or benzaldehyde, which may be substituted by OH groups or halogen atoms.

5. A polymeric acetal as claimed in claim 1, in which not more than 85 mol % of the vinyl alcohol units present in the starting graft polyvinyl alcohol are acetalized.

6. A polymeric acetal as claimed in claim 1, in which, in the acetalized graft polyvinyl alcohol, the content of vinyl alcohol units before the acetalization was >10% by weight, based on the starting graft polyvinyl alcohol.

7. A polymeric acetal as claimed in claim 1, in which the polyalkylene oxide graft base or the polyurethane graft base onto which the acetalized polyvinyl alcohol units are grafted had a molecular weight of between 200 and 50000 g/mol before the grafting.

8. A polymeric acetal as claimed in claim 1, in which the polyalkylene oxide graft base or the polyurethane graft base also contains, in addition to vinyl acetal units and vinyl alcohol units, grafted-on monomer units of carboxylic acid vinyl esters having 3 to 20 carbon atoms and optionally units of other ethylenically unsaturated and optionally hydrolyzable monomers and/or hydrolysis products thereof.

9. A polymeric acetal as claimed in claim 1, in which the polyurethane graft base contains units of aromatic and/or aliphatic and/or cycloaliphatic diisocyanates.

10. A polymeric acetal as claimed in claim 1, wherein the polyalkylene oxide graft base contains units of ethylene oxide, propylene oxide or butylene oxide, or block copolymers of the $(C_2-C_4)$-alkylene oxides mentioned, and the molecular weight of the polyalkylene oxide graft base was in the range between 600 and 200,000 g/mol before the grafting.

11. A process for the preparation of a polymeric acetal as claimed in claim 1, by reaction of a starting polyvinyl alcohol, grafted onto a polyalkylene oxide graft base or a polyurethane graft base, with an aldehyde in aqueous solution in the presence of an acid catalyst and isolation of the polymeric acetal, which comprises adding the aldehyde component of the formula (I) as claimed in claim 1 and optionally other aldehyde components, in accordance with the stoichiometry, dropwise, optionally under an inert gas atmosphere, at temperatures below the turbidity temperature and with stirring, to an aqueous graft polyvinyl alcohol solution which has been initially introduced into the reaction vessel and contains the acid catalyst, starting at low temperatures of between 0° and 15° C. and gradually increasing the temperature to 25° to 70° C., subsequently stirring the mixture for 3 to 5 hours under acetalization conditions at the elevated temperature when the metering in has ended, and in the case of the preparation of mixed acetals, optionally alternatively cooling the reaction mixture again to a temperature of between 0° and 15° C. after the reaction of the aldehyde component of the formula (I), metering in the other aldehyde components at temperatures between 0° and 15°

C., while gradually increasing the temperature to 25° to 70° C., with renewed subsequent stirring for 3 to 5 hours under acetalization conditions at the elevated temperature when the metering in has ended, subsequently neutralizing the reaction mixture to pH 7–8 by addition of alkali, cooling the mixture to room temperature and isolating the resulting graft polyvinyl acetal in powder form or in solid compact form or as a solution or as a dispersion.

* * * * *